Jan. 4, 1938.  C. F. ROSENBLAD  2,104,333
METHOD AND MEANS FOR REGULATING THE TEMPERATURE OF FLOWING MEDIA
Filed Oct. 10, 1936
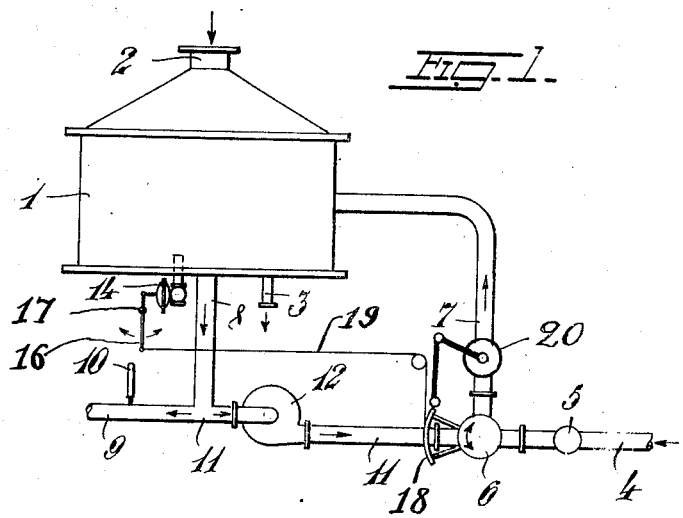
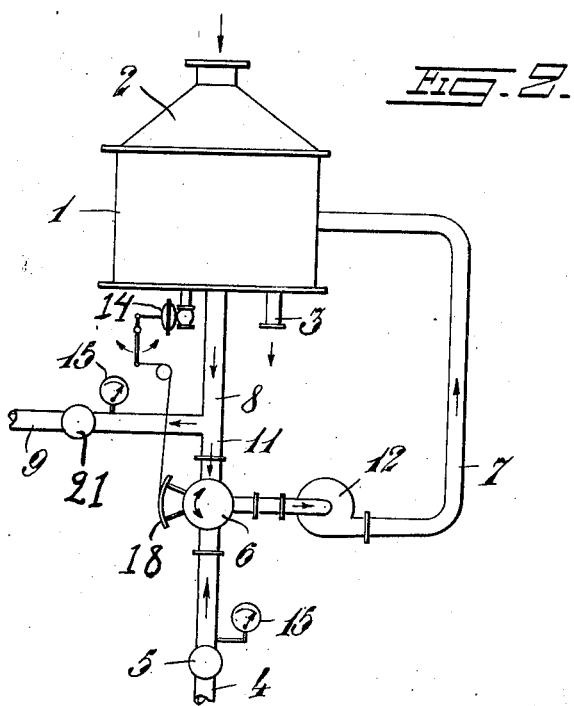
Inventor:
Curt Fredrik Rosenblad
By Jarvis C. Marble
his Attorney Patented Jan. 4, 1938

2,104,333

UNITED STATES PATENT OFFICE 2,104,333

METHOD AND MEANS FOR REGULATING THE TEMPERATURE OF FLOWING MEDIA

Curt Fredrik Rosenblad, Sodertalje, Sweden, assignor to Aktiebolaget Rosenblads Patenter, Stockholm, Sweden, a corporation of Sweden Application October 10, 1936, Serial No. 104,956
In Sweden October 17, 1935

7 Claims. (Cl. 257—2)

In condensing gaseous fluids, that is steam, vapours and gases, it was heretofore customary to regulate the supply of cooling liquid only, when the load varies. The regulation is most simply controlled in accordance with the temperature of the warm cooling liquid drawn off from the apparatus, the procedure being as follows:

If, for instance, in a condenser, the supply of steam, vapours or gases is reduced for some reason, the inlet for the cooling liquid is throttled until that temperature is reached, for which the temperature impulse regulator is set. Before the regulator commences to open again, the throttling has often been continued so far that the supply of the cooling liquid is substantially cut off. At this moment, however, the cooling liquid in the condenser has already been heated to a temperature substantially higher than that desired, and a certain time lapses before the regulator is able to reduce that temperature sufficiently. These inconveniences due to the inertia of the regulating system are further increased because the heat transmitting capacity varies as the quantities flowing through vary or more properly as the velocity of flow varies, the influence of which upon the coefficient of heat transmission tends to exaggerate the variations of the temperature of the cooling liquid discharged from the apparatus. This applies especially to condensers which are operated at a high speed of flow, such as the spiral sheet metal apparatus, which in all other respects are highly efficient. Under all circumstances this results in great variations in the temperature of the cooling liquid discharged and causes detrimental stresses within the apparatus due to differences of temperature and danger of corrosion and deposition of substances within the channels.

The chief object of this invention is to overcome such difficulties and to effect the regulation with comparatively small variations of the temperature of the cooling liquid in the apparatus. Another object is to render such variations more slow and continuous.

Another object of this invention is to avoid detrimental stresses within the apparatus due to variations of temperature.

Another object of this invention is to reduce the risk of corrosion and also of detrimental depositions of substances on the heat transmission surfaces.

A further object of the invention is to keep the heat transmitting efficiency of the condenser at its maximum value at all loads. In contrast to the systems heretofore known my improved system acts rapidly and does not increase the variations by surging or hunting.

Other objects will be evident from the following specification and claims.

The invention refers both to a method and to an apparatus for carrying out said method.

Two embodiments of such apparatus are illustrated in the annexed drawing, showing elevations of the apparatus. In the drawing corresponding parts carry the same reference characters in both figures.

Referring now to Fig. 1 of the drawing, 1 indicates a condenser illustrated as an apparatus of spiral metal sheets of well-known construction, for instance as shown in U. S. Patent No. 1,956,133. Said apparatus has a steam inlet 2 at its top and a condensate outlet 3 at its bottom. Cold cooling liquid is supplied through the pipe 4 having a throttling valve 5. After passing through a mixing valve 6, constructed as a three-way valve, the cooling liquid enters the pipe 7 supplying cooling liquid to the apparatus. After having passed through the apparatus, the cooling liquid which is now warm is drawn off through pipe 8, which is branched both to an outlet pipe 9 having a thermometer 10 and to a return pipe 11 having a circulation pump 12. The pipe 11 is connected to the mixing valve 6, which is controlled in accordance with a temperature-actuated impulse-giving member at any of the outlets of the apparatus for any of the liquids. In the embodiments shown said member consists of a thermostatic device 14 acting upon a lever 16 fulcrumed on the pivot 17. The other end of said lever acts upon the actuating member 18 of the valve 6 via a wire-rope 19. The member 18 is returned by gravity, when the wire-rope 19 slackens. Thus, the valve 6 will be adjusted in accordance with the temperature of the warm cooling liquid discharged from the apparatus 1.

In the operation, the valve 5 is set in such position that at the temperature and the pressure of the cold cooling liquid available, just so much of said liquid is admitted that at the maximum load, in its passage through the condenser said liquid is heated to a predetermined temperature to which the thermostat 14 has been set in advance.

When the apparatus is in operation, the circulation pump 12 is run continuously. If the heat transmission is reduced, for instance, due to a reduction of the quantity of steam or vapour supplied, the temperature of the condensate also falls. Thereupon the member 14 operates and acts on the valve 6, which throttles the supply from the pipe 4 for the cold liquid and opens the supply from the return pipe 11. Consequently, part of the warm cooling liquid drawn off through the pipe 8 is returned to the pipe 7, in which it is mixed with cold cooling liquid freshly supplied. Thus, the temperature of the mixed cooling liquid entering the condenser will be raised. The ratio of mixing is regulated in such manner that just so much of the warm liquid is returned to compensate for the reduced quantity of cold liquid that the desired temperature of the warm cooling liquid discharged from the apparatus 1 is maintained in spite of the reduced heat transmission. Furthermore, the mixing valve 6 is, preferably, constructed in such manner that independently of the setting of said valve the total quantity of liquid supplied through the pipe 7 remains approximately constant. For the same purpose a valve of constant flow, as shown for instance in U. S. Patent 1,944,088 may be used instead of a three-way valve.

If the load is again increased, the valve 6 is actuated in the opposite direction so that the supply of cold liquid from the pipe 4 is increased, while the supply from the return pipe 11 is throttled. If no steam whatever is supplied to the apparatus 1, the warm liquid will be returned in its entirety and will circulate in a closed circuit.

The embodiment illustrated in Fig. 2 differs from that illustrated in Fig. 1 chiefly by the fact that the circulation pump 12 is inserted into the mixing pipe 7. For this reason, this pump not only effects the necessary circulation of warm liquid but also sucks the cold liquid through the mixing valve 6. In this case manometers 15 preferably are inserted into the pipes 4 and 9. The mode of operation is substantially the same as that described above in connection with Fig. 1.

It is evident from the facts given above that by means of this invention the supply of cooling liquid may be kept substantially constant at variable loads, but the difference of temperature between the gaseous fluid to be condensed and the cooling medium will vary. However, there are cases, in which it is not possible to have too low a difference of temperature, for instance, when gas is to be cooled below 100° C. Then the regulating system must be altered in such manner that the total supply of cooling liquid decreases continuously at reduced loads. In the embodiment shown in Fig. 1 this is most simply effected by using a circulation pump 12 having a falling characteristic, i. e. a pump giving a reduced pressure at an increase of the quantity of liquid. If the pressure of the liquid in the pipes 4 and 9 remains constant, the mixing valve 6 will then open the supply from the return pipe 11 and correspondingly throttle the supply from the pipe 4 for the cold cooling liquid, when the load decreases, and simultaneously the pressure of the liquid in the mixing pipe 7 falls so as to decrease the total quantity of liquid passing through. The same effect may be attained by arranging a special throttling valve 20 (Fig. 1) in the path of circulation, for instance, in the pipe 7. Said throttling valve 20 is controlled by the member 14 in such manner that the more the mixing valve 6 increases the supply of the return liquid from pipe 11, the more will said throttling valve 20 throttle the flow through pipe 7.

Of course, the valve 20 may be omitted in the system shown in Fig. 1 and may be inserted into any of the pipes 7, 8 and 11 in Fig. 2.

In the embodiment shown in Fig. 2 a throttle valve 21 is inserted into the pipe 9.

What I claim is:—

1. A method of regulating the temperature of media discharged from apparatus for indirect heat transmission, comprising, supplying a gaseous medium to said apparatus, condensing said gaseous medium by indirect heat transmission to a cooling medium also supplied to said apparatus, discharging the condensed gaseous medium and also the warm cooling medium heated by the heat transmission separately from said apparatus, mixing a portion of said warm cooling medium with cold cooling medium, supplying said mixture as cooling medium to said apparatus, the ratio of warm and cold medium in said mixture being controlled automatically so as to keep the temperature of the media discharged from said apparatus substantially constant for any quantity of said gaseous medium supplied per unit of time, and varying the velocity of flow of said cooling medium within the apparatus to decrease and increase continuously, when the quantity of said gaseous medium supplied per unit of time decreases and increases, respectively.

2. In a plant for condensing gaseous media, in combination, a condenser for indirect heat transmission, an inlet to said apparatus for a gaseous medium to said apparatus, an outlet from said apparatus for the condensate of said gaseous medium, a mixing pipe for supplying cooling medium to said apparatus, a mixing valve connected with said mixing pipe, a supply pipe for a cold cooling medium connected with said mixing valve, a discharge pipe for warm cooling medium from said apparatus, a branch pipe from said discharge pipe to said mixing valve, a circulation pump and a throttle valve in the circuit of circulation formed by said discharge pipe, said branch pipe and said mixing pipe, and a common control member for said mixing valve and said throttle valve.

3. In a plant for condensing gaseous media, in combination, a condenser for indirect heat transmission, an inlet to said apparatus for a gaseous medium, an outlet from said apparatus for the condensate of said gaseous medium, a mixing pipe for supplying cooling medium to said apparatus, a mixing valve connected with said mixing pipe, a supply pipe for a cold cooling medium connected with said mixing valve, a discharge pipe for warm cooling medium from said apparatus, a branch pipe from said discharge pipe to said mixing valve, a circulation pump and a throttle valve in the circuit of circulation formed by said discharge pipe, said branch pipe and said mixing pipe, and a thermostatic device at said discharge pipe operatively connected with said mixing valve and said throttle valve and adapted to control them in opposite directions in accordance with the temperature of any of the media discharged.

4. In a heat exchange system, in combination, a surface heat exchanger having an inlet and an outlet for fluid to be cooled, an inlet conduit for supplying cooling fluid to said heat exchanger, an outlet conduit for withdrawing cooling fluid from said heat exchanger, a branch conduit connecting said inlet conduit with said outlet conduit, said heat exchanger and said conduits forming a circulating system for circulation of cooling fluid, means for supplying fresh cooling fluid to said inlet conduit, and means for controlling the relative proportions of fluid supplied to said inlet conduit from said branch conduit and from said supply means in accordance with the outlet temperature of the fluid to be cooled, and for controlling the quantity of cooling fluid flowing through said heat exchanger so that the quantity varies inversely with variations in the proportion of cooling fluid supplied to said inlet conduit from said branch conduit.

5. In a heat exchange system, in combination, a surface heat exchanger having an inlet and an outlet for fluid to be cooled, an inlet conduit for supplying cooling fluid to said heat exchanger, an outlet conduit for withdrawing cooling fluid from said heat exchanger, a branch conduit connecting said inlet conduit with said outlet conduit, said heat exchanger and said conduits forming a circulating system for circulation of cooling fluid, means for supplying fresh cooling fluid to said inlet conduit, a mixing valve for controlling the relative proportions of fluid supplied to said inlet conduit from said branch conduit and from said supply means in accordance with the outlet temperature of the fluid to be cooled, and means in said circulating system for controlling the quantity of cooling fluid flowing through said heat exchanger so that the quantity varies inversely with variations in the proportion of cooling fluid supplied to said inlet conduit from said branch conduit.

6. In a heat exchange system, in combination, a surface heat exchanger having an inlet and an outlet for fluid to be cooled, an inlet conduit for supplying cooling fluid to said heat exchanger, an outlet conduit for withdrawing cooling fluid from said heat exchanger, a branch conduit connecting said inlet conduit with said outlet conduit, said heat exchanger and said conduits forming a circulating system for circulation of cooling fluid, means for supplying fresh cooling fluid to said inlet conduit, a mixing valve for controlling the relative proportions of fluid supplied to said inlet conduit from said branch conduit and from said supply means in accordance with the outlet temperature of the fluid to be cooled, and a fluid pump disposed in said circulating system ahead of said mixing valve and being so constructed as to deliver fluid at a reduced pressure upon an increase in the quantity of fluid delivered.

7. In a heat exchange system, in combination, a surface heat exchanger having an inlet and an outlet for fluid to be cooled, an inlet conduit for supplying cooling fluid to said heat exchanger, an outlet conduit for withdrawing cooling fluid from said heat exchanger, a branch conduit connecting said inlet conduit with said outlet conduit, said heat exchanger and said conduits forming a circulating system for circulation of cooling fluid, means for supplying fresh cooling fluid to said inlet conduit, a mixing valve for controlling the relative proportions of fluid supplied to said inlet conduit from said branch conduit and from said supply means in accordance with the outlet temperature of the fluid to be cooled, a throttle valve disposed in said circulating system, and means for regulating said throttle valve so that it reduces flow therethrough upon an increase in the proportion of fluid supplied to said inlet conduit from said branch conduit.

CURT FREDRIK ROSENBLAD.